Patented Aug. 19, 1952

2,607,779

UNITED STATES PATENT OFFICE 2,607,779

PROCESS FOR PREPARING INDOLE COMPOUNDS

Edmund B. Towne and Hubert M. Hill, Rochester, N. Y., assignors to Eastman Kodak Company, Rochester, N. Y., a corporation of New Jersey No Drawing. Application March 31, 1950, Serial No. 153,304

14 Claims. (Cl. 260—319)

This invention relates to a novel and advantageous process for preparing indole compounds comprising reacting a N-(2-chloroallyl)-arylamine with hydrogen fluoride. It is especially directed to a process for preparing indole compounds by reacting a N-(2-chloroallyl)-aniline with hydrogen fluoride.

It is known to prepare 2-methylindole by cyclizing acetone phenylhydrazone with ZnCl₂: (Annalen 236, 126, German Patent 38,784 and Frdl. I. 151). 2-methylindole can also be prepared by the cyclization of

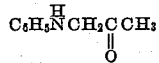

Likewise 2-methylindole can be prepared by the cyclization of N-acetyl-o-toluidine with sodium amide (Organic Synthesis 22, 94 [1942]). Of these three known methods for preparing 2-methylindole, the last is probably the best.

The novel process of the present invention provides a more economical method for preparing indole compounds than any of the prior methods of which we are aware since hydrogen fluoride is cheap, the N-(2-chloroallyl)-arylamines are relatively inexpensive and satisfactory yields are ordinarily obtained. The indole compounds obtained in accordance with our new process are, in large part, old compounds. They are useful, for example, in the preparation of perfumes, dyes, and inhibitors.

In accordance with the process of our invention, a N-(2-chloroallyl)-arylamine in which there is a free position ortho to the 2-chloroallylamino group is heated with hydrogen fluoride. By this treatment the N-(2-chloroallyl)-arylamine employed in the reaction is cyclized to an indole compound. The reaction can be carried out at a temperature of from about 120° C. to about 200° C. At 100° C. little or no reaction takes place. A temperature of 160° C.–170° C. appears to be advantageous and is preferred. The use of anhydrous hydrogen fluoride is advantageous and is preferred.

The N-(2-chloroallyl)-arylamine compounds used in the process of our invention must be unsubstituted in a position ortho to the 2-chloroallylamino group because cyclization takes place in a position ortho to this group. The following equation illustrates the cyclization of N-(2-chloroallyl)-aniline to 2-methylindole in accordance with the process of our invention:

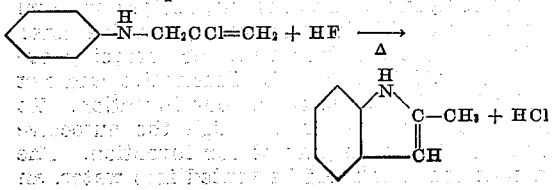

So far as we are aware, the N-(2-chloroallyl)-arylamines employed in the process of our invention are new compounds and accordingly their preparation is fully disclosed hereinafter.

The process of our invention in addition to being novel and advantageous is also unexpected. Assuming that N-(2-chloroallyl)-aniline would cyclize to an indole compound, the normal expectation would be to obtain 3-methylindole instead of 2-methylindole.

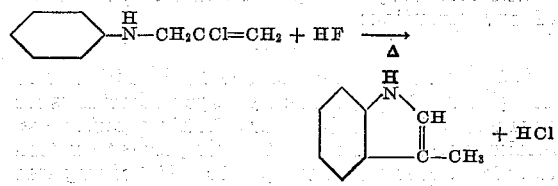

Again it might be expected that if a N-(2-chloroallyl)-arylamine such as N-(2-chloroallyl)-aniline were heated with HF the reaction would go as follows:

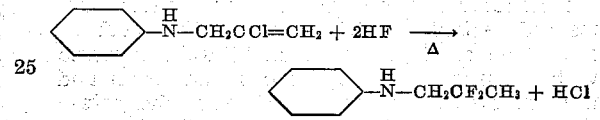

Actually

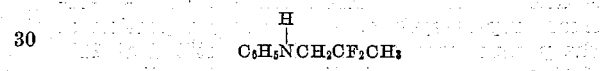

is formed in amounts varying from little or none to about a 10% yield while carrying out the process of our invention.

Additionally the possibility existed that if a N-(2-chloroallyl)-arylamine such as N-(2-chloroallyl)-aniline were heated with HF the reaction would go as follows:

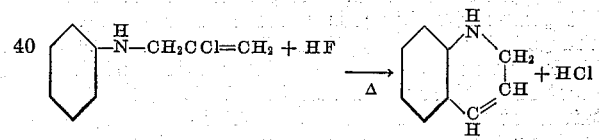

In contrast to N-(2-chloroallyl)-aniline the known compound N-(γ-chloroallyl)-aniline

as more fully set forth hereinafter, does not cyclize to form an indole compound when reacted with HF. Instead, a tarry residue and some unidentified liquids were obtained.

The product obtained by reacting N-(2-chloroallyl)-aniline with HF in accordance with the process of our invention was identified as follows: (1) The melting point of the purified product was taken and found to be the same as that for a known sample of 2-methylindole. (2) The melting point of a mixture of the purified product and of an authentic specimen of 2-methylindole was taken. The melting point obtained was that of 2-methylindole. (3) The melting point of a mixture of the product obtained by reacting 2-methylindole with benzaldehyde and of the product obtained by similarly reacting the product obtained in accordance with the process of our invention with benzaldehyde was taken. The melting points of both reaction products as well as their mixed melting point were the same.

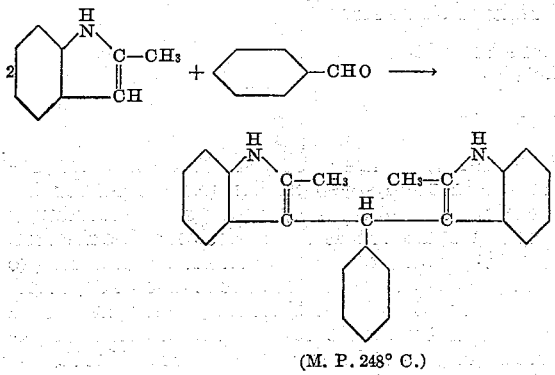

(M. P. 248° C.)

The following examples illustrate the process of our invention:

*Example I*

295 grams of N-(2-chloroallyl)-aniline and 400 grams of anhydrous hydrogen fluoride were charged into a 1½ liter shaking autoclave. Shaking was begun and the temperature raised to 140° C. over a 12 hour period and heating was continued for 24 hours more at this temperature. The autoclave was then cooled to 50° C. and the gaseous contents were bled through a dilute aqueous sodium hydroxide scrubber. After this the contents of the autoclave were poured onto ice and neutralized with aqueous sodium carbonate. The solid product formed was extracted with benzene from the aqueous suspension and the benzine solution was dried over solid potassium hydroxide. Rectification of the benzene solution yielded a small amount of N-(2-difluoropropyl)-aniline, but the major portion of the product was a solid which distilled at 117° C./5 mm. Crystallization of this solid from ligroin yielded 124 grams (54% yield) of 2-methylindole having a melting point of 58.5° C.–59.5° C. Its identity was shown as described hereinbefore.

*Example II*

200 grams of N-(2-chloroallyl)-aniline and 320 grams of anhydrous hydrogen fluoride were charged into a 1½ liter shaking autoclave. Shaking was begun and the temperature of the reaction mixture was raised to 200° C. and maintained at this temperature for 16 hours. Upon working up the reaction mixture in the same way as described in Example 1, a yield of 105 grams (67% yield) of 2-methylindole was obtained.

By the use of 241 grams of N-(2-chloroallyl)-4-chloroaniline in place of N-(2-chloroallyl)-aniline in the foregoing example, 5-chloro-2-methylindole which melts at 119° C. is obtained.

*Example III*

200 grams of N-(2-chloroallyl)-m-toluidine and 200 grams of anhydrous hydrogen fluoride were charged into a 1½ liter shaking autoclave. Shaking was begun and the temperature of the reaction mixture was raised to 170° C. and maintained at this temperature for 15 hours. Upon cooling, the gases were vented into an aqueous sodium hydroxide solution and the contents of the autoclave were poured onto ice and neutralized with aqueous sodium hydroxide. The oily material was taken up in benzene and dried over KOH. Rectification of the benzene extract gave 77 grams of a mixture of 2,4-dimethylindole and 2,6-dimethylindole, B. P. 140°–145° C./5 mm. This is a 48% yield.

*Example IV*

358 grams of N-(2-chloroallyl)-1-naphthylamine and 300 grams of anhydrous hydrogen fluoride were sealed in a 1½ liter autoclave. Shaking was begun and the temperature of the reaction mixture was raised to 180° C. and maintained at this temperature for 16 hours. Upon cooling to 80° C. the gases were vented into an aqueous sodium hydroxide solution and the contents of the autoclave were poured onto ice and neutralized with aqueous sodium hydroxide. The crude solid product formed was recovered by filtration. It gave a positive indole pine splint test. The solid reaction product was extracted with benzene in a Soxhlet extractor for 24 hours. Upon evaporation of the benzene extract 2-methyl-6,7-benzo-indole melting at 132° C. was obtained. It has the formula:

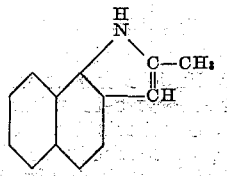

Similarly, by the use of N-(2-chloroallyl)-2-naphthylamine in place of N-(2-chloroallyl)-1-naphthylamine in the foregoing example, 2-methyl-4,5-benzo-indole boiling at 205° C.–210° C./10 mm. is obtained. It has the formula:

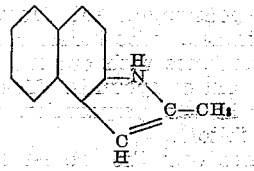

Some 2-methyl-5,6-benzo-indole is also obtained.

*Example V*

200 grams of N-(γ-chloroallyl)-aniline and 300 grams of anhydrous HF were charged into a 1½ liter shaking autoclave. Shaking was begun and the temperature of the reaction mixture was raised to about 136° C. and maintained at this temperature for 36 hours. The autoclave was then cooled and the gaseous contents were vented into a dilute aqueous sodium hydroxide solution. After this the contents of the autoclave were poured onto ice and neutralized with aqueous sodium hydroxide. The reaction mixture thus obtained was steam distilled to obtain a fraction weighing about 25–30 grams. Upon rectification of this material three unidentified fractions were obtained. Each of these fractions gave a negative test when tested for the presence of an indole compound. The residue, 117 grams, from the steam distillation was an asphalt-like mass.

It will be understood that the foregoing examples are intended to be illustrative and not limitative of the process of our invention. To illustrate, the manner in which the autoclave is vented forms no part of our invention. The gaseous contents could be vented into water, an alkaline solution other than aqueous sodium hydroxide or even into the atmosphere insofar as the operability of the reaction is concerned.

Other indole compounds, in addition to those given in the specific examples, which can be readily prepared in accordance with the process of our invention include those listed hereinafter:

| Starting Compound | Product |
| --- | --- |
| N-(2-chloroallyl)-o-nitroaniline | 7-nitro-2-methylindole. |
| N-(2-chloroallyl)-p-aminophenol | 5-hydroxy-2-methylindole. |
| N-(2-chloroallyl)-aniline-2-sulfonic acid. | 2-methylindole-7-sulfonic acid. |
| N-(2-chloroallyl)-2-chloroaniline | 7-chloro-2-methylindole. |
| N-(2-chloroallyl)-p-toluidine | 2,5-dimethylindole. |
| N-(2-chloroallyl)-o-toluidine | 2,7-dimethylindole. |

The N-(2-chloroallyl)-arylamine compounds used in the process of our invention are ordinarily prepared by reacting a primary arylamine with 2,3-dichloropropene at steam-bath temperature in the presence of aqueous sodium carbonate. The reaction can also be carried out in the presence of a nonaqueous inert solvent such as ethyl alcohol, isopropyl alcohol, n-butyl alcohol, n-amyl alcohol, acetone, benzene, toluene, xylene and the like. Also, as will be understood, acid binding agents other than sodium carbonate such as sodium bicarbonate, potassium carbonate, potassium bicarbonate, magnesium oxide and calcium carbonate, for example, can be used. Higher boiling solvents such as n-amyl alcohol or xylene are especially useful when the reaction between the aniline compound (o-chloroaniline and o-nitroaniline, for example) and 2,3-dichloropropane goes slowly with aqueous sodium carbonate at steam-bath temperature. Thus, the temperature range can preferably vary from 100° C. to about 150° C., depending on the primary arylamine being reacted. In general, the N-(2-chloroallyl)-arylamine compounds are colorless to straw-colored liquids with an odor similar to but fainter than aniline.

The preparation of the N-(2-chloroallyl)-arylamine compounds will be clear from the detailed examples which follow.

*Example VI*

A mixture of 333 grams of 2,3-dichloropropene, 279 grams of aniline, 175 grams of sodium carbonate and 500 cc. of water was heated on a steam bath with stirring for 7 hours. After cooling, the organic layer was separated from the water layer and dried over KOH. Upon fractionation under reduced pressure, 378 grams (75% yield) of N-(2-chloroallyl)-aniline boiling at 109° C./5 mm. were obtained.

*Example VII*

A mixture of 222 grams of 2,3-dichloropropene, 214 grams of m-toluidine, 117 grams of $Na_2CO_3$ and 600 cc. of water was heated on a steam bath with stirring for 6 hours. Upon cooling, the organic layer was separated from the water layer and dried over KOH. Upon fractionation under reduced pressure, 245 grams (67.5% yield) of N-(2-chloroallyl)-m-toluidine boiling at 122° C./5 mm. were obtained.

*Example VIII*

A mixture of 286 grams of α-naphthylamine, 250 grams of 2,3-dichloropropene, 117 grams of $Na_2CO_3$ and 500 cc. of water was heated on a steam bath with stirring for 20 hours. Upon cooling, the organic layer was separated from the water layer and dried over KOH. Upon vacuum distillation, 358 grams (82.5% yield) of N-(2-chloroallyl)-α-naphthylamine boiling at 178° C.–180° C./5 mm. were obtained.

Following the general procedure just described, the following compounds are readily prepared: N-(2-chloroallyl)-o-toluidine, N-(2-chloroallyl)-p-toluidine, N-(2-chloroallyl)-o-chloroaniline, N-(2-chloroallyl)-m-chloroaniline, N-(2-chloroallyl)-p-chloroaniline, N-(2-chloroallyl)-o-nitroaniline, N-(2-chloroallyl)-m-nitroaniline, N-(2-chloroallyl)-p-nitroaniline, N-(2-chloroallyl)-p-phenylenediamine, N-(2-chloroallyl)-o-phenylenediamine, N-(2-chloroallyl)-m-phenylenediamine, N-(2-chloroallyl)-β-naphthylamine, N-(2-chloroallyl)-p-aminophenol, N-(2-chloroallyl)-p-aminobenzoic acid, N-(2-chloroallyl)-o-sulfanilic acid.

We claim:

1. A process for preparing indole compounds which comprises heating a N-(2-chloroallyl)-arylamine compound in which there is a free position ortho to the 2-chloroallylamino group with hydrogen fluoride in a closed reaction vessel at a temperature from about 120° C. to about 200° C.

2. A process for preparing indole compounds which comprises heatng a N-(2-chloroallyl)-arylamine compound in which there is a free position ortho to the 2-chloroallylamino group with anhydrous hydrogen fluoride in a closed reaction vessel at a temperature from about 160° C. to about 170° C.

3. A process for preparing indole compounds which comprises heating a N-(2-chloroallyl)-arylamine compound in which there is a free position ortho to the 2-chloroallylamino group with anhydrous hydrogen fluoride in a closed reaction vessel at a temperature from about 120° C. to about 200° C.

4. A process for preparing indole compounds which comprises heating a N-(2-chloroallyl)-aniline compound in which there is a free position ortho to the 2-chlorallylamino group with hydrogen fluoride in a closed reaction vessel at a temperature from about 120° C. to about 200° C.

5. A process for preparing indole compounds which comprises heating a N-(2-chloroallyl)-aniline compound in which there is a free position ortho to the 2-chloroallylamino group with anhydrous hydrogen fluoride in a closed reaction vessel at a temperature from about 160° C. to about 170° C.

6. A process for preparing indole compounds which comprises heating a N-(2-chloroallyl)-aniline compound in which there is a free position ortho to the 2-chloroallylamino group with anhydrous hydrogen fluoride in a closed reaction vessel at a temperature from about 120° C. to about 200° C.

7. A process for preparing 2-methylindole which comprises heating N-(2-chloroallyl)-aniline with hydrogen fluoride in a closed reaction vessel at a temperature from about 120° C. to about 200° C.

8. A process for preparing 2-methylindole which comprises heating N-(2-chloroallyl)-aniline with anhydrous hydrogen fluoride in a closed reaction vessel at a temperature from about 160° C. to 170° C.

9. A process for preparing 2-methylindole which comprises heating N-(2-chloroallyl)-aniline with anhydrous hydrogen fluoride in a closed reaction vessel at a temperature from about 120° C. to about 200° C.

10. A process for preparing 2-methylindole which comprises heating N-(2-chloroallyl)-aniline with anhydrous hydrogen fluoride in a closed reaction vessel at a temperature from about 120° C. to 200° C. and under autogenous pressure.

11. The process which comprises heating N-(2-chloroallyl)-m-toluidine with anhydrous hydrogen fluoride in a closed reaction vessel at a temperature from about 120° C. to about 200° C.

12. The process which comprises heating N-(2-chloroallyl)-α-naphthylamine with anhydrous hydrogen fluoride in a closed reaction vessel at a temperature from about 120° C. to about 200° C.

13. The process which comprises heating N-(2-chloroallyl)-β-naphthylamine with anhydrous hydrogen fluoride in a closed reaction vessel at a temperature from about 120° C. to about 200° C.

14. The process which comprises heating N-(2-chloroallyl)-o-nitroaniline with anhydrous hydrogen fluoride in a closed reaction vessel at a temperature from about 120° C. to about 200° C.

EDMUND B. TOWNE.
HUBERT M. HILL.

REFERENCES CITED

The following references are of record in the file of this patent:

Richter: Organic Chemistry, vol. 4, p. 229, Elsevier Publishing Co. (1947).